(12) United States Patent
Okamoto et al.

(10) Patent No.: US 7,872,066 B2
(45) Date of Patent: Jan. 18, 2011

(54) RUBBER COMPOSITION FOR BELT USE AND RUBBER BELT

(75) Inventors: Naomi Okamoto, Ichihara (JP); Takashi Wada, Ichihara (JP)

(73) Assignee: UBE Industries, Ltd (JP)

( * ) Notice: Subject to any disclaimer, the term of this patent is extended or adjusted under 35 U.S.C. 154(b) by 0 days.

(21) Appl. No.: 12/303,171

(22) PCT Filed: Feb. 26, 2008

(86) PCT No.: PCT/JP2008/053314

§ 371 (c)(1),
(2), (4) Date: Jan. 22, 2009

(87) PCT Pub. No.: WO2008/105415

PCT Pub. Date: Sep. 4, 2008

(65) Prior Publication Data

US 2009/0312484 A1  Dec. 17, 2009

(30) Foreign Application Priority Data

Feb. 27, 2007 (JP) .............................. 2007-047891
Aug. 8, 2007 (JP) .............................. 2007-207124

(51) Int. Cl.
C08K 3/34 (2006.01)
B60C 1/00 (2006.01)
(52) U.S. Cl. ....................... 524/493; 524/526
(58) Field of Classification Search ................. 524/493
See application file for complete search history.

(56) References Cited

U.S. PATENT DOCUMENTS

2007/0155889 A1* 7/2007 Okamoto et al. ............ 524/492

FOREIGN PATENT DOCUMENTS

| JP | 2004-346220 | 12/2004 |
|---|---|---|
| JP | 2006-022243 | 1/2006 |
| JP | 2006-022246 | 1/2006 |
| JP | 2006-249298 | 9/2006 |
| JP | 2006-249299 | 9/2006 |
| JP | 2007-002057 | 1/2007 |
| JP | 2007-031568 | 2/2007 |
| JP | 2007-119743 | 5/2007 |
| WO | 2006/052035 A1 | 5/2006 |
| WO | 2008/007733 A1 | 1/2008 |

OTHER PUBLICATIONS

Extended European Search Report which issued in connection with corresponding European Patent Application No. 08711998.8.
DATABASE WPI Week 200612 Thomson Scientific, London, GB; AN 2006-113559 & JP 2006 022243 A; UBE IND. LTD.; Jan. 26, 2006.
DATABASE WPI Week 200612 Thomson Scientific, London, GB; AN 2006-113560 & JP 2006 022244 A; UBE IND. LTD.; Jan. 26, 2006.
DATABASE WPI Week 200612 Thomson Scientific, London, GB; AN 2006-113561 & JP 2006 022246 A; UBE IND. LTD.; Jan. 26, 2006.

* cited by examiner

Primary Examiner—Ling-Siu Choi
Assistant Examiner—Hui Chin
(74) Attorney, Agent, or Firm—Clark Hill PLC

(57) ABSTRACT

The invention provides a rubber composition for belt use suitable for industrial rubber belts with less energy loss and excellent durability such resistance to flex crack growth.

The rubber composition for belt use comprises (A) 90-5 mass % of a vinyl-cis-polybutadiene rubber including (b) 1-30 mass % of specific syndiotactic 1,2-polybutadiene crystal fibers having an average fiber length of crystal fibers equal to 200 nm or below, an average aspect ratio of 10 or lower, the number of crystal fibers having a fiber length of 200 nm or below equal to 90 or more per 25 $\mu m^2$, and a melting point of 170° C. or higher, and (a) 99-70 mass % of a cis-polybutadiene rubber; (B) 10-95 mass % of a diene-based rubber other than (A); and (C) 20-70 parts by mass of a rubber reinforcing agent compounded on the basis of 100 parts by mass of the rubber components (A)+(B), wherein the rubber reinforcing agent (C) contains at least carbon black and silica, wherein the compounding amount of the silica in the rubber reinforcing agent is 70 mass % or less.

10 Claims, 2 Drawing Sheets

(a)

(b)

RUBBER COMPOSITION FOR BELT USE AND RUBBER BELT

TECHNICAL FIELD

The present invention relates to a rubber composition for belt use and a rubber belt, suitable for industrial rubber belts, with light weights, less energy loss, excellent durability such as resistance to flex crack growth and low heat build up, and physical properties balanced among processing, fundamental, endurable and energy-saving properties.

BACKGROUND ART

In general, industrial rubber belts are roughly classified into transmission belts for transmitting power and conveyer belts for conveying articles. Available rubber raw materials include natural rubber, polybutadiene rubber, styrene-butadiene rubber, ethylenepropylenediene rubber, chloroprene rubber, chloro-sulfonated polyethylene rubber, nitrile rubber, and hydrogenated nitrile rubber.

A rubber composition for use in rubber belts is required to have large tensile strength, appropriate hardness, flexibility, elasticity, good flexibility, and a large impact resistance, and is further desired to achieve energy saving and light weight. For the purpose of satisfying these requirements, the use of an inorganic reinforcer or short fibers for reinforcement is proposed. An example of the reinforcement with short fibers is disclosed in Patent Document 1 as a rubber composition for conveyer belts. The rubber composition comprises a natural rubber and a butadiene rubber containing a crystalline syndiotactic-1,2-polybutadiene resin (also referred to as a vinyl-cis-polybutadiene rubber). The natural rubber and the butadiene rubber are compounded to retain fundamental properties of matter such as high tensile strength and wearing resistance and reduce power consumption when used in a conveyer belt.

Patent Document 1: JP 2004-346220A

DISCLOSURE OF THE INVENTION

Problems to be Solved by the Invention

An increase in the amount of the inorganic reinforcer such as carbon black to enhance hardness, tensile stress, tensile strength at break, abrasion resistance and so forth also results in an increase in dynamic heat build up. It also results in an increase in specific gravity of the compounded material as a problem because it is not suitable for weight reduction. On the other hand, the rubber composition described in Patent Document, ultra-fine dispersion of 1,2-polybutadiene short fiber crystals into the butadiene rubber or matrix component is not sufficient. Therefore, sufficient effects can not be exerted always on processability, tensile stress, tensile strength and resistance to flex crack growth as a problem.

To solve the above problems, the present invention provides a rubber composition for belt use and a rubber belt, suitable for industrial rubber belts, with light weights, less energy loss, excellent durability such as resistance to flex crack growth and low heat build up and nice properties of matter balanced among processing, fundamental, endurable and energy-saving properties.

Means to Solve the Problems

To achieve the above object, the inventors et al. have eagerly studied and consequently found that a certain vinyl-cis-polybutadiene rubber may be compounded with a rubber reinforcer of carbon black and silica such that the compounding amount of silica in the rubber reinforcer becomes 70 mass % or less. This case makes it possible to provide an industrial rubber belt with less energy loss and excellent durability such as resistance to flex crack growth. Namely, the present invention provides a rubber composition for belt use, comprising: (A) 90-5 mass % of a vinyl-cis-polybutadiene rubber including (b) 1-30 mass % of specific syndiotactic 1,2-polybutadiene crystal fibers having an average fiber length of crystal fibers equal to 200 nm or below, an average aspect ratio of 10 or lower, the number of crystal fibers having a fiber length of 200 nm or below equal to 90 or more per 25 $\mu m^2$, and a melting point of 170° C. or higher, and (a) 99-70 mass % of a cis-polybutadiene rubber; (B) 10-95 mass % of a diene-based rubber other than (A); and (C) 20-70 parts by mass of a rubber reinforcer compounded on the basis of 100 parts by mass of the rubber components (A)+(B), wherein the rubber reinforcer (C) contains at least carbon black and silica, wherein the compounding amount of the silica in the rubber reinforcer is 70 mass % or less. A rubber belt according to the present invention comprises the rubber composition for belt use employed as a rubber base material.

Effects of the Invention

The present invention can provide a rubber composition for belt use and a rubber belt, suitable for industrial rubber belts, with less energy loss, excellent durability such as resistance to flex crack growth, and nice properties of matter balanced among processing, fundamental, endurable and energy-saving properties.

THE BEST MODE FOR CARRYING OUT THE INVENTION

The vinyl-cis-polybutadiene rubber (A) contained in the rubber composition for belt use according to the present invention is configured as follows in general. Namely, it includes (b) 1-30 mass % of syndiotactic-1,2-polybutadiene (hereinafter referred to as "1,2-polybutadiene") crystal fibers having a melting point of 170° C., and (a) 99-70 mass % of a cis-polybutadiene rubber.

As for the above 1,2-polybutadiene crystal fibers (b), the average fiber length of crystal fibers is equal to 200 nm or below, preferably 150 nm or below. The average aspect ratio is 10 or lower, preferably 4 or lower. The number of crystal fibers having a fiber length of 200 nm or below is equal to 90 or more, preferably 100 or more per 25 $\mu m^2$. The melting point is 170° C. or higher, preferably 190-220° C.

Preferably, the vinyl-cis-polybutadiene rubber (A) contained in the rubber composition for belt use according to the present invention includes an unsaturated polymeric substance (c) having at least one unsaturated double bond per repeat unit. Preferably, the unsaturated polymeric substance (c) is adsorbed in the 1,2-polybutadiene crystal fibers (b) and dispersed in the matrix component or cis-polybutadiene rubber (a). A boiling n-hexane insoluble matter of the vinyl-cis-polybutadiene rubber (A), which is the 1,2-polybutadiene crystal fibers (b) and part or all of the unsaturated polymeric substance (c). The proportion (graft ratio) of the unsaturated polymeric substance (c) adsorbed to the 1,2-polybutadiene crystal fibers (b) can be calculated through the infrared absorption spectrum analysis. The proportion (graft rate) of the unsaturated polymeric substance (c) adsorbed to the 1,2-polybutadiene crystal fibers (b) is 5-200 mass %, preferably 10-120 mass %, particularly preferably 20-90 mass %. Falling within this range improves the dispersibility in the syndiotactic -1,2-polybutadiene crystal fibers (b), and prevents various physical properties possibly caused in the vinyl-cis-polybutadiene rubber from lowering as a preferable effect. The boiling n-hexane insoluble matter is the remainder extracted after 2 g of the vinyl-cis-polybutadiene rubber (A) is boiled in 200 ml of n-hexane for 4 hours through the Soxhlet method, of which value is represented by mass %.

The principal components of the cis-polybutadiene rubber (a) include at least one of a high cis-1,4-polybutadiene itself and a polybutadiene having a high cis-1,4 structure as the principal structure. Desirably, the cis-polybutadiene rubber has the following properties. Namely, the cis-1,4 structure content is generally 90 mol % or more, preferably 95 mol % or more. The Mooney viscosity ($ML_{1+4}$, 100° C.: hereinafter referred to as "ML") is 10-130, preferably 15-80. The toluene solution viscosity (hereinafter referred to as "T-cp") is 10-200 cp, preferably 10-150 cp. It is desired to substantially contain no gel component.

The vinyl-cis-polybutadiene rubber contains the 1,2-polybutadiene crystal fibers (b) and the cis-polybutadiene rubber (a) in a proportion of 99-70 mass % of the cis-polybutadiene rubber (a) to 1-30 mass % of the 1,2-polybutadiene crystal fibers (b). A proportion of the 1,2-polybutadiene crystal fibers (b) higher than the above easily results in larger short fiber crystals of the 1,2-polybutadiene crystal fibers (b) in the cis-polybutadiene rubber (a), worsening the dispersibility. A proportion of the 1,2-polybutadiene crystal fibers (b) lower than the above lowers the reinforcement with the 1,2-polybutadiene crystal fibers (b). In this case, the characterized excellent properties, such as processability, tensile stress, tensile strength, and resistance to flex crack growth, are hardly expressed undesirably. The proportion of the unsaturated polymeric substance (c) to the vinyl-cis-polybutadiene rubber (A) is 0.1-30 mass %, preferably 1-20 mass %. Falling within this range improves the dispersibility of 1,2-polybutadiene crystal fibers (b), and prevents various physical properties possibly caused in the vinyl-cis-polybutadiene rubber from lowering as a preferable effect.

The above vinyl-cis-polybutadiene rubber may be produced suitably through the following process for production.

In production of the vinyl-cis-polybutadiene rubber (A), polymerization of 1,3-butadiene is executed using a hydrocarbon-based solvent in general. The hydrocarbon-based solvent comprises preferably a hydrocarbon-based solvent having a solubility parameter (hereinafter referred to as "SP value") of 9.0 or below, more preferably 8.5 or below. Examples of the hydrocarbon-based solvent having a SP value of 9.0 or below include aliphatic hydrocarbons or alicyclic hydrocarbons such as n-hexane (SP value: 7.2), n-pentane (SP value: 7.0), n-octane (SP value: 7.5), cyclohexane (SP value: 8.1), and n-butane (SP value: 6.6). Among those, cyclohexane can be used preferably.

The SP values of the solvents are publicly known from the Rubber Industrial Manual (The Society of Rubber Industry, Japan, 4th ver., p. 721, Jan. 20, 1994) and so forth.

The use of a solvent with a SP value smaller than 9.0 improves the dispersibility of 1,2-polybutadiene short crystal fibers into the matrix component or cis-polybutadiene rubber. As a result, the resultant vinyl-cis-polybutadiene rubber can express excellent properties such as processability, tensile stress, tensile strength, and resistance to flex crack growth.

In production of the vinyl-cis-polybutadiene rubber (A), 1,3-butadiene is mixed with the hydrocarbon-based solvent, and then the concentration of water in the resultant solution is regulated. The water content ranges preferably 0.1-1.0 mol, particularly preferably 0.2-1.0 mol per 1 mol of the later-described organoaluminum compound used as a cis-1,4 polymerization catalyst in the solution. Within this range, sufficient catalyst activity can be obtained, and a suitable cis-1,4 structure content and molecular weight can be obtained. Further, generation of gels during polymerization can be suppressed and accordingly attachment of gels to polymerization vessels can be prevented. Thus, continuous polymerization time can be extended preferably. Publicly known methods can be applied to regulate the concentration of water. A method of adding and dispersing it through a porous filtering material (JP 4-85304A) is also effective.

An organoaluminum compound is added as one of the cis-1,4 polymerization catalysts to the above solution obtained by regulating the concentration of water. The organoaluminum compound includes a preferably useable compound represented by the general formula $AlR_nX_{3-n}$. Suitable specific examples thereof include diethyl aluminum monochloride, diethyl aluminum monobromide, duisobutyl aluminum monochloride, dicyclohexyl aluminum monochloride, diphenyl aluminum monochloride, and diethyl aluminum sesquichloride. The usage of the organoaluminum compound is preferably not less than 0.1 mmol, more preferably 0.5-50 mmol per 1 mol, the total amount of 1,3-butadiene.

Next, a soluble cobalt compound is added as the cis-1,4 polymerization catalyst to the organoaluminum compound-added mixture solution to subject 1,3-butadiene to cis-1,4 polymerization. The soluble cobalt compound is soluble or evenly dispersible in a hydrocarbon-based solvent or liquid 1,3-butadiene used. Suitable examples include β-diketone complexes of cobalt, such as acetylacetonato cobalt (II), and acetylacetonato cobalt (III); β-keto acid ester complexes of cobalt, such as an acetoacetic acid ethyl ester complex; organocarboxylic acid cobalt salts having 6 or more carbon atoms, such as cobalt octoate, cobalt naphthenate, and cobalt benzoate; and halgenated cobalt complexes such as a cobalt chloride pyridine complex, and a cobalt chloride ethylalcohol complex. The usage of the soluble cobalt compound is preferably not less than 0.001 mmole, more preferably not less than 0.005 mmole per 1 mole of 1,3-butadiene. The molar ratio (Al/Co) of the organoaluminum chloride to the soluble cobalt compound is preferably not less than 10, more preferably not less than 50. Other available materials than the soluble cobalt compound include organocarboxylic acid salts of nickel, organocomplex salts of nickel, organolithium compounds, organocarboxylic acid salts of neodymium, and organocomplex salts of neodymium.

The temperature of cis-1,4 polymerization is desired to range from more than 0 to 100° C., preferably 10-100° C., further preferably 20-100° C. The polymerization time (average residence time) ranges from 10 minutes to 2 hours preferably. Preferably, the cis-1,4 polymerization is executed such that the polymer concentration after the cis-1,4 polymerization becomes 5-26 mass %. The polymerization vessel may include a single vessel or two or more linked vessels. The polymerization is executed such that the solution is stirred and mixed in the polymerization vessel (polymerization reactor). The polymerization vessel for use in polymerization may include a polymerization vessel equipped with a agitator for high solution viscosity, for example, the device described in JP 40-2645B.

In production of the vinyl-cis-polybutadiene rubber, publicly known molecular weight regulators, for example, non-conjugated dienes such as cyclooctadiene, allene, and methylallene (1,2-butadiene); and α-olefins such as ethylene, propylene, and buten-1 may be used on cis-1,4 polymerization. In addition, publicly known gelling inhibitors may be used to suppress generation of gels during polymerization.

The content of the cis-1,4 structure in the polymerized product is 80 mol % or more, preferably 90 mol % or more. The Mooney viscosity is 10-130, preferably 15-80. It is controlled to substantially contain no gel component.

To the cis-1,4 polymerization reaction mixture obtained as above, at least an organoaluminum compound represented by the general formula $AlR_3$ and carbon disulfide and, if required, the above soluble cobalt compound are added as the syndiotactic-1,2 polymerization (hereinafter referred to as the "1,2polymerization") catalyst to subject 1,3-butadiene to 1,2 polymerization, thereby producing the vinyl-cis-polybutadiene in the presence of these additives. In this case, 1,3-butadiene may be added to the above polymerization reaction mixture. Alternatively, non-reacted 1,3-butadiene may be subjected to reaction therewith instead of addition. Suitable examples of the organoaluminum compound represented by the general formula $AlR_3$ include trimethyl aluminum, triethyl aluminum, tri-isobutyl aluminum, tri-n-hexyl aluminum, and triphenyl aluminum. The organoaluminum compound is preferably 0.1 mmol or more, particularly 0.5-50 mmol or more per 1 mol of 1,3-butadiene. The carbon disulfide is not limited in particular but is desired to contain no water content. The concentration of carbon disulfide is not more than 20 mmol/L, particularly preferably 0.01-10 mmol/L. Alternatives of carbon disulfide may include a publicly known phenyl isothiocyanate and a xanthogenate oxidation compound.

The temperature of 1,2 polymerization ranges from −5° C. to 100° C., preferably from −5° C. to 70° C., further preferably 0-50° C. To the polymerization system for 1,2 polymerization, 1-50 parts by mass of, preferably 1-20 parts by mass of 1,3-butadiene per 100 parts by mass of the cis-1,4 polymerization reaction mixture may be added to increase the yield of 1,2-polybutadiene on 1,2 polymerization. The polymerization time (average residence time) ranges from 10 minutes to. 2 hours. Preferably, the 1,2 polymerization is executed such that the polymer concentration after the 1,2 polymerization becomes 9-29 mass %. The polymerization vessel may include a single vessel or two or more linked vessels. The polymerization is executed such that the solution is stirred and mixed in the polymerization vessel (polymerization reactor). The polymerization vessel for use in 1,2 polymerization may include a polymerization vessel equipped with a agitator for high solution viscosity, for example, the device described in JP 40-2645B because the viscosity becomes higher during 1,2 polymerization and makes polymers easily attachable.

Preferably, the production of the vinyl-cis-polybutadiene rubber through the cis-1,4 polymerization and then the 1,2 polymerization executed as above includes the step of adding an unsaturated polymeric substance (c) having at least one unsaturated double bond per repeat unit to the production process of the vinyl-cis-polybutadiene rubber. Even the unsaturated polymeric substance can not exert the effect of the present invention if it is added after the production of the vinyl-cis-polybutadiene rubber, for example, at the time of compounding. The unsaturated polymeric substance is added to the production system into the polymerization reaction mixture, preferably at any time before the cis-1,4 polymerization to the 1,2 polymerization, further preferably before and/or after the cis-1,4 polymerization, more preferably at the time of the 1,2 polymerization.

Preferably, the unsaturated polymeric substance (c) is at least one selected from polyisoprene, crystalline polybutadiene having a melting point below 170° C., liquid polybutadiene, and derivatives thereof.

Examples of polyisoprene include normal synthetic polyisoprene (such as cis-1,4-polyisoprene having 90 mol % or more cis-structure), liquid polyisoprene, trans-polyisoprene, and other modified polyisoprenes.

Preferable examples of the crystalline polybutadiene having a melting point below 170° C. include a crystalline polybutadiene having a melting point of 0-150° C., such as a low-melting point 1,2-polybutadiene, and a trans-polybutadiene.

Examples of the liquid polybutadiene include an ultra-low molecular polybutadiene having an intrinsic viscosity [η]=1 or lower. The intrinsic viscosity [η] is a value derived from the following expression. In this case, 0.1 g of a sample rubber and 100 ml of toluene were supplied in a triangular flask and completely dissolved at 30° C. Thereafter, 10 ml of the solution was fed in a Cannon-Fenske dynamic viscometer held in a temperature-regulated tank kept at 30° C. to measure the drop time (T) of the solution.

$\eta sp = T/T_0 - 1$ ($T_0$: Drop Time of Only Toluene)

$\eta sp/c = [\eta] + k'[\eta]^2 c$ (ηsp: Specific viscosity, k': Huggins constant (0.37), c: Sample concentration (g/ml))

Examples of the derivatives include an isoprene-isobutylene copolymer, an isoprene-styrene copolymer, a styrene-isoprene-styrene block copolymer, a liquid epoxidated polybutadiene, a liquid carboxylic modified polybutadiene, and hydrogenated materials of derivatives thereof.

Of the above unsaturated polymeric substances, the isoprene, the styrene-isoprene-styrene block copolymer, and the 1,2-polybutadiene having a melting point of 70-110° C. are used preferably. The unsaturated polymeric substances may be used solely or in mixture of two or more.

As described above, if the unsaturated polymeric substance (c) is added, the effect of the unsaturated polymeric substance (c) on compatibility extremely improves the dispersability of 1,2-polybutadiene having a melting point above 170° C. into the matrix component or cis-polybutadiene rubber in the resultant vinyl-cis-polybutadiene rubber (A). As a result, the vinyl-cis-polybutadiene rubber has excellent properties of matter such as processability, tensile stress, tensile strength and resistance to flex crack growth.

The adding amount of the unsaturated polymeric substance ranges preferably 0.1-30 mass %, more preferably 1-20 mass % on the basis of the vinyl-cis-polybutadiene rubber (A). Regardless of the time of addition, agitation is executed preferably for 10 minutes to 3 hours after the addition, more preferably for 10-30 minutes.

In production of the vinyl-cis-polybutadiene rubber, at least one of organic compounds and polymeric compounds having one or more oxygen bonds may be added. Preferably, these compounds may include such compounds that contain an ether group, an epoxy group, a carboxylic group, an ester group, a hydroxyl group, or a carbonyl group. Specific compounds may include acid anhydride, aliphatic alcohol, aromatic alcohol, aliphatic ether, aromatic ether; aliphatic carboxylic acid, aromatic carboxylic acid, unsaturated carboxylic acid, aliphatic carboxylic acid ester, aromatic carboxylic acid ester, unsaturated carboxylic acid ester, phenol resin, nylon resin, polyurethane, polyethylene glycol, epoxidated polybutadiene, polyester, epoxidated styrene-polybutadiene copolymer, and polyaryl ether.

Addition of at least one of organic compounds and polymeric compounds having one or more oxygen bonds to the polymerization system varies the interfacial affinity between the cis-polybutadiene that is the matrix components of the vinyl-cis-polybutadiene rubber and the 1,2-polybutadiene resin. This results in the effects on mono dispersion of fiber crystals of the 1,2-polybutadiene resin and on an improvement in the above physical properties of the vinyl-cis-polybutadiene rubber.

After the polymerization reaction reaches a certain polymerization rate, a publicly known anti-oxidant maybe added in accordance with a normal method. Examples of the anti-oxidant may include phenol-based 2,6-di-t-butyl-p-cresol (BHT), phosphorous-based trinonylphenyl phosphite (TNP), sulfur-based 4,6-bis(octylthiomethyl)-o-cresol, and dilauryl-3,3'-thiodipropionate (TPL). These may be used solely or in combination of two or more. The anti-oxidant is added 0.001-5 parts by mass on the basis of 100 parts by mass of the vinyl-cis-polybutadiene rubber. Next, a polymerization terminator is added to stop the polymerization reaction. A method therefor comprises supplying a polymerization reaction mixture to a polymerization stop vessel after the polymerization reaction; and providing a large amount of a polar solvent, for example, alcohol such as methanol and ethanol, or water into the polymerization reaction mixture. Another method comprises bringing an inorganic acid such as hydrochloric acid and sulfuric acid, an organic acid such as acetic acid and benzoic acid, or a hydrogen chloride gas into a polymerization solution. These methods are publicly known. Next, in accordance with a normal method, the resultant vinyl-cis-polybutadiene rubber is separately collected, deashed, and dried to acquire the target vinyl-cis-polybutadiene rubber.

In the process for production of the vinyl-cis-polybutadiene rubber, the mother liquid of the polymerization reaction mixture contains the non-reacted 1,3-butadiene, hydrocarbon-based solvent and carbon disulfide remaining after the resultant vinyl-cis-polybutadiene rubber is separately acquired. From the mother liquid, the 1,3-butadiene and the hydrocarbon-based solvent are separated through distillation in general. In addition, the process of adsorbing/separating the carbon disulfide or the process of separating the carbon disulfide-attached product is applied to separately remove the carbon disulfide and collect the 1,3-butadiene and the hydrocarbon-based solvent, which substantially contain no carbon disulfide. In addition, distillation is applied to collect three components from the mother liquid of the polymerization reaction mixture and the process of adsorbing/separating or the process of separating the carbon disulfide-attached product may be used to separately remove carbon disulfide from the distilled product, thereby collecting the 1,3-butadiene and the hydrocarbon-based solvent, which substantially contain no carbon disulfide. The carbon disulfide and the hydrocarbon-based solvent thus collected can be reused in combination with newly supplemented 1,3-butadiene.

In production of the above vinyl-cis-polybutadiene rubber (A), a solution of vinyl-cis-polybutadiene (e) containing 10-60 mass %, preferably 20-50 mass % of the 1,2-polybutadiene crystal fibers (b) in the cis-polybutadiene matrix is obtained through the above method. Into this solution, a hydrocarbon-based solvent and a cis-polybutadiene (f) having a cis-1,4 structure content of 80 mol % or more may be solution-mixed to produce the vinyl-cis-polybutadiene rubber (A).

The cis-polybutadiene has a 5-mass-% toluene solution viscosity of 30-250 cp, preferably 50-200 cp, and more preferably 100-200 cp.

The cis-polybutadiene (f) to be solution-mixed can be obtained similarly through the step of adding the above cis-1,4 polymerization catalyst for executing cis-1,4 polymerization of 1,3-butadiene.

The resultant cis-polybutadiene (f) has a cis-1,4 structure content of 80 mol % or more, preferably 90 mol % or more, and more preferably 95 mol % or more. It also has a Mooney viscosity of 10-130, preferably 15-80 in particular and substantially contains no gel component. It further has a 5-mass-% toluene solution viscosity (Tcp) of 10-250 cp, preferably 30-200 cp.

In the vinyl-cis-polybutadiene rubber (A) obtained through solution mixture of the vinyl-cis-polybutadiene (e) and the cis-polybutadiene (f), the ratio of (e) to (f) is preferably (e):(f)=1:1-9.

In accordance with the process for production of the vinyl-cis-polybutadiene rubber (A), the vinyl-cis-polybutadiene rubber contained in the rubber composition for belt use according to the present invention can be produced continuously for a long period of time with excellent operability for the catalyst component at a higher catalyst efficiency and with industrial advantage. In particular, it can be produced continuously at a higher conversion with industrial advantage without the polymerization solution attached to the inner walls and stirring fans in the polymerization vessel and other weak stirring portions.

The vinyl-cis-polybutadiene rubber (A) obtained through the above method generally comprises (b) 1-30 mass % of 1,2-polybutadiene crystal fibers having a melting point of 170° C. or higher and (a) 99-70 mass % of a cis-polybutadiene rubber. The cis-polybutadiene rubber (a) has 80 mol % or more cis-1,4-polybutadiene in the microstructure and residual trans-1,4-polybutadiene and vinyl-1,2-polybutadiene. The 1,2-polybutadiene crystal fibers (b) having a melting point of 170° C. or higher are such crystal fibers that have a melting point of 170-220° C., an average fiber length of crystal fibers equal to 200 nm or below, an average aspect ratio of 10 or below, and the number of crystal fibers having a fiber length of 200 nm or below equal to 90 or more per 25 $\mu m^2$. The cis-polybutadiene rubber (a) has a ML of preferably 10-130, more preferably 15-80.

Desirably, the vinyl-cis-polybutadiene rubber (A) contained in the rubber composition for belt use according to the present invention has the following characteristics.

(i) The 1,2-polybutadiene crystal fibers (b) have a molecular weight index, $\eta sp/c$, ranging 0.5-4.

(ii) The cis-polybutadiene (a) has a cis-1,4-structure content of 90 mol % or more in the microstructure.

(iii) The cis-polybutadiene (a) has a relation between a toluene solution viscosity and a Mooney viscosity, T-cp/ML$\geq$1.

(iv) The cis-polybutadiene (a) has an intrinsic viscosity [$\eta$] ranging 1.0-5.0.

The vinyl-cis-polybutadiene rubber thus produced can express excellent physical properties, such as processability, tensile stress, tensile strength, and resistance to flex crack growth. For that purpose, preferably the 1,2-polybutadiene crystal fibers dispersed in the vinyl-cis-polybutadiene rubber partially disperse in the matrix of the cis-polybutadiene rubber as fine crystals in a mono dispersion state and coexist with larger 1,2-polybutadiene crystal fibers having a agglomerate. In addition to the 1,2-polybutadiene crystal fibers having a melting point of 170° C. or higher, preferably the above-described unsaturated polymeric substance disperses in the matrix of the cis-polybutadiene rubber. Preferably, the unsaturated polymeric substance has a higher affinity with the 1,2-polybutadiene crystal fibers in the matrix of the cis-polybutadiene rubber and disperses in the vicinity of the 1,2-polybutadiene crystal fibers in a physically and chemically adsorbed state. If the 1,2-polybutadiene crystal fibers having a melting point of 170° C. or higher and the unsaturated polymeric substance coexist and disperse in the matrix of the cis-polybutadiene rubber as described above, the above properties of matter become excellent preferably.

A diene-based rubber (B) other than (A) is compounded 10-95 parts by mass with 90-5 parts by mass of the vinyl-cis-polybutadiene rubber (A) produced as above. Preferably, the diene-based rubber (B) is at least one of natural rubber and polyisoprene.

A rubber reinforcing agent (C) compounded in the rubber composition for belt use according to the present invention may include at least carbon black and silica and additionally various white carbon, active calcium carbonate, and ultra-particulate magnesium silicate. Particularly preferable carbon black includes such carbon black that has a particle diameter of 90 nm or below and a dibutylphthalate (DBP) oil absorption of 70 ml/100 g or more, for example, FEF, FF, GPF, SAF, ISAF, SRF, and HAF.

In the rubber composition for belt use according to the present invention, the compounding amount of the rubber reinforcing agent (C) is 20-70 parts by mass, preferably 30-60 parts by mass on the basis of 100 parts by mass of the rubber compositions consisting of the vinyl-cis-polybutadiene rubber (A) and the diene-based rubber (B). The compounding amount of silica in the rubber reinforcer is preferably 70 mass % or below, more preferably 5-65, and particularly preferably 10-63. An increase in the compounding amount of silica can reduce the energy loss. An amount of silica more than 70 mass % though deteriorates the durability such as resistance to flex crack growth.

In the rubber composition for belt use according to the present invention, an energy loss may has an index $\Delta H$ represented by the following Expression 2. Namely, the energy loss can be determined less if $\Delta H$ is smaller. $\Delta H$ is preferably 0.1 or below, more preferably 0.08 or below.

$$\Delta H = (SG \times \tan \delta)/M25 \quad \text{[Expression 1]}$$

(where SG denotes a specific gravity (g/cm$^3$) at 23° C.;
tan δ a loss coefficient at a frequency of 10 Hz, a dynamic distortion of 2%, and 60° C.; and M25 a tensile stress (MPa) at 25% extension).

The rubber composition for belt use according to the present invention can be obtained by mixing/kneading the above components using a Bunbury mixer, an open roll mill, a kneader mixer, or a twin-screw kneaded machine.

The rubber composition for belt use according to the present invention is mixed/kneaded with a compounding agent such as a vulcanizing agent, a vulcanizing accelerator, an anti-oxidant, a filler, a process oil, a zinc white, and a stearic acid, if required, which are usually employed in the rubber industry.

Available examples of the vulcanizing agent include publicly known vulcanizing agents, for example, sulfur, organic peroxides, resinous vulcanizing agents, metal oxides such as a magnesium oxide.

Available examples of the vulcanizing accelerator include publicly known vulcanizing accelerator, for example, aldehyde, ammonia, amine, guanidine, thiourea, thiazole, thiuram, dithiocarbide, and xanthate.

Examples of the anti-oxidant may be amine-ketone-based, imidazole-based, amine-based, phenol-based, sulfur-based and phosphorous-based.

Examples of the filler include inorganic filler such as calcium carbonate, basic magnesium carbonate, clay, litharge, and diatomsceous earth; and organic filler such as reclaimed rubber, and powdered rubber.

Available examples of the process oil may be aromatic-based, naphthene-based, and paraffin-based.

EXAMPLES

With shown Examples and Comparative examples, the present invention is described specifically. In Examples and Comparative examples, physical properties of the raw rubber of the vinyl-cis-polybutadiene rubber, and properties of matter of compounded materials and vulcanized materials of the resultant rubber composition were measured as follows. The properties of matter of compounded materials and vulcanized materials were evaluated from exponents calculated on the basis of 100 given to Comparative example 1.

[Physical Properties of Raw Rubber]

A value of the Mooney viscosity ($ML_{1+4}$, 100° C.) was measured on the basis of JIS-K6300 at 100° C. using a Mooney viscometer (SMV-202 from Shimadzu Corporation) with 1-minute preliminary heating and 4-minute measuring.

The intrinsic viscosity [η] is a value derived from the following expression. In this case, 0.1 g of a sample rubber and 100 ml of toluene were supplied in a triangular flask and completely dissolved at 30° C. Thereafter, 10 ml of the solution was fed in a Cannon-Fenske dynamic viscometer held in a temperature-regulated tank kept at 30° C. to measure the drop time (T) of the solution.

$\eta sp = T/T_0 - 1$ ($T_0$: Drop Time of Only Toluene)

$\eta sp/c = [\eta] + k'[\eta]^2 c$ (ηsp: Specific viscosity, k': Huggins constant (0.37),
c: Sample concentration (g/ml))

The toluene solution viscosity (T-cp) was measured at 25° C. using a Cannon-Fenske viscometer No.400. In this case, 2.28 g of a polymer was dissolved in 50 ml of toluene, and a standard solution (JIS-Z8809) for viscometer calibration was then used as a standard solution.

The microstructure was measured by infrared absorption spectrum analysis. The microstructure was calculated from the absorption intensity ratio at cis 740 cm$^{-1}$, trans 967 cm$^{-1}$, vinyl 910 cm$^{-1}$.

As for ηsp/c, the reduced viscosity was measured at 135° C. from 0.20 g/dl of an o-dichloro benzene solution as a guide of the molecular weight of 1,2-polybutadiene crystal fibers.

As for the melting point and content of the 1,2-polybutadiene crystal fibers, a differential scanning calorimeter (DSC-50 from Shimadzu Corporation) was used to obtain a heat absorption curve at a temperature rising rate of 10° C./min. The melting point was determined as the peak temperature and the content was calculated from the amount of heat absorption.

The average fiber length of crystal fibers, the number of crystal fibers having a fiber length of 200 nm or below, and the average aspect ratio of crystal fibers were obtained as follows. The vinyl-cis-polybutadiene rubber was vulcanized in a mixture solution of sulfur monochloride and carbon disulfide and an ultra-thin slice was cut out of the resultant vulcanized material using an ultramicrotome (from Leica). The slice was observed with a transmission electron microscope (H-7100FA from Hitachi Ltd.) to take a 5000-fold photograph. The photograph was binarized within a range of 25 μm$^2$ using image analysis software (Win ROOF from Mitani Corporation) to obtain a fiber length, an aspect ratio and an area of crystal fibers. Next, the average fiber length and the aspect ratio were averaged by multiplying the value of crystal fibers by the area fraction to turn them into an average fiber length of crystal fibers and an average aspect ratio of crystal fibers. The number of crystal fibers was obtained by calculating the number of crystal fibers having a fiber length of 200 nm or below per 1 mass % of the content of 1,2-polybutadiene crystal fibers.

[Physical Properties of Compounded Material]

A value of the Mooney viscosity ($ML_{1+4}$, 100° C.) was measured on the basis of JIS-K6300 at 100° C. using a Mooney viscometer (SMV-202 from Shimadzu Corporation) with 1-minute preliminary heating and 4-minute measuring. A smaller numeric value indicates lower viscosity and better fluidity.

As for Die swell, a ratio of the cross-sectional area of the compounded material on extrusion to the cross-sectional area of the die orifice (where L/D=1.5 mm/1.5 mm) was measured as a guide of dimension stability of the compounded material at 100° C. and a shearing rate of 100 sec$^{-1}$ using a processability tester (MPT from Monsanto Co.). A smaller numeric value indicates better extrusion processability.

[Physical Properties of Vulcanized Material]

Hardness was measured in accordance with the measuring method stipulated under JIS-K6253.

100% tensile stress was measured on the basis of JIS-K6251. A larger numeric value indicates a higher tensile stress.

Tensile strength on rupture was measured on the basis of JIS-K6251. A larger numeric value indicates higher tensile strength.

Tear strength was measured on the basis of JIS-K6252. A larger numeric value indicates higher tear stress.

As for resistance to flex crack growth, a crack length was measured on the basis of JIS-K6260 using a DeMattia flex tester (from Ueshima Co.). after a sample holder was flexed one hundred thousands times with a motion distance of 20 mm. A smaller numeric value indicates better resistance to flex crack growth.

[Energy Saving Property]

As for M25 (MPa), a tensile stress on 25% extension was measured (at a measurement temperature of 23° C.) on the basis of the method described in JIS-K6251.

The loss coefficient (tan δ) was measured using RPA2000 (from Alpha Technologies Inc.) at 60° C., 10 Hz and 2% distortion. A smaller numeric value indicates a less energy loss and better condition.

The specific gravity (SG) was measured on the basis of the method described in JIS-K6268.

ΔH was derived from the above measured values in accordance with the above Expression 1.

ΔH (Exponent) was derived from the following Expression 2 defined by SG (Exponent), tan δ (Exponent) and M25 (Exponent), which were represented by relative values to 100, which was given to the measured values (SG, tan δ, M25) on the composition obtained in Comparison example 1.

$$\Delta H \text{ (Exponent)} = (SG \text{ (Exponent)} \times \tan \delta \text{(Exponent)}) / M25 \text{ (Exponent)}$$ [Expression 2]

Production Example 1

Production of Vinyl-Cis-Polybutadiene Rubber: Sample A-1

A stirrer-equipped stainless reactor having a 5L-inner volume replaced with a nitrogen gas was prepared, in which 3.5 L of a polymerization solution (butadiene: 30 mass %, cyclohexane: 70mass %) was supplied. Further, 5.3mmol of water, 10.5 mmol of diethyl aluminum chloride, 1.8 mmol of carbon disulfide, 32 mmol of cyclooctadiene, and 0.03 mmol of cobalt octoate were added, followed by stirring at 50° C. for 30 minutes to execute cis-1,4 polymerization (a-1). The resultant polymerization product solution was additionally supplied with 10 mass % (for resultant vinyl-cis-polybutadiene rubber) of polyisoprene (IR) (ML=87, cis-1,4structure=98mol %), followed by stirring at 50° C. for 1 hour. Thereafter, 560 ml of butadiene, 4.5 mmol of water, 13.4 mmol of triethyl aluminum chloride, and 0.07 mmol of cobalt octoate were added, followed by stirring at 50° C. for 30 minutes to execute 1,2 polymerization (b-1). A solution of 4,6-bis(octylthiomethyl)-o-cresol in methanol was added thereto as the anti-oxidant, and the polymerization was terminated. Thereafter, non-reacted butadiene and 2-butenes were evaporated and removed, followed by drying in vacuum at 105° C. for 60 minutes to obtain a vinyl-cis-polybutadiene rubber (A-1). The vinyl-cis-polybutadiene rubber (A-1) has a boiling n-hexane insoluble matter, which is the 1,2-polybutadiene crystal fibers (b) and part or all of the unsaturated polymeric substance. The proportion (graft rate) of the unsaturated polymeric substance adsorbed to the 1,2-polybutadiene can be calculated through the infrared absorption spectrum analysis. The boiling n-hexane insoluble matter is the remainder extracted after 2 g of the vinyl-cis-polybutadiene rubber (A-1) is boiled in 200 ml of n-hexane for 4 hours through the Soxhlet method, of which value is represented by mass % (it is the content of the 1,2-polybutadiene crystal fibers other than the unsaturated polymeric substance-added system). As calculated from the infrared absorption spectrum analysis of the boiling n-hexane insoluble matter in the resultant vinyl-cis-polybutadiene rubber (A-1), the proportion (graft rate) of polyisoprene adsorbed to 1,2-polybutadiene was 67 mass %.

Production Example 2

Production of Vinyl-Cis-Polybutadiene Rubber: Sample A-2

Except that the hydrocarbon-based solvent was changed from cyclohexane to benzene and no polyisoprene (unsaturated polymeric substance) was added, a vinyl-cis-polybutadiene rubber (A-2) was produced similarly through the process for production of the sample A-1.

Physical Properties of the samples A-1 and A-2 are shown in Table 1.

TABLE 1

|  |  | Production Example 1 | Production Example 2 |
|---|---|---|---|
| Major solvent | (Type) | Cylohexane | Benzene |
|  | (SP value) | 8.1 | 9.1 |
| Vinyl-cis-polybutadiene rubber (A) | (Type) | A-1 | A-2 |
|  | Mooney viscosity ($ML_{1+4}$, 100° C.) | 65 | 52 |
|  | 1,2-Polybutadiene crystal fibers (b) (mass %) | 12.3 | 12.1 |
|  | Polyisoprene (mass %) | 10 | — |
| 1,4-cis-polybutadiene (a) |  | a-1 | a-2 |
|  | Mooney viscosity ($ML_{1+4}$, 100° C.) | 31 | 31 |
|  | Intrinsic | 1.8 | 1.8 |

TABLE 1-continued

|  | Production Example 1 | Production Example 2 |
|---|---|---|
| viscosity [η] (dl/g) |  |  |
| Weight average molecular weight (Mw) × $10^4$ | 43 | 43 |
| Toluene solution viscosity (cp) | 56 | 57 |
| Cis-1,4 structure (mol %) | 98.2 | 98.1 |
| Trans-1,4 structure (mol %) | 0.9 | 1.0 |
| 1,2 structure (mol %) | 0.9 | 0.9 |
| 1,2-Polybutadiene crystal fibers (b) |  |  |
| ηsp/c | 1.8 | 1.5 |
| Melting point of crystal fibers (° C.) | 202 | 201 |
| Average fiber length of crystal fibers (nm) | 121 | 434 |
| The number of crystal fibers*[1] pcs/25 μm$^2$ | 137 | 61 |
| Average aspect ration of crystal fibers | 2.1 | 4.1 |

*[1] The number of crystal fibers having a fiber length of 200 nm or below

Next, the above sample A-1 was additionally supplied with natural rubber, carbon black and silica shown in a compounding table in Table 2 as well as a compounding agent other than a vulcanization accelerator and sulfur shown in Table 4. A Bunbury mixer was used to mix/knead the mixture for 4 minutes and then an open roll mill was used to compound the vulcanization accelerator and sulfur to obtain compounded materials according to Examples 1-8. In addition, the above samples A-1 and A-2 were compounded by the compounding amounts shown in Table 3 similar to Examples 1-8 to obtain compounded materials according to Comparison examples 1-6. Physical properties of the compounded materials according to Examples 1-8 and Comparison examples 1-6 were measured and shown in Tables 2 and 3.

TABLE 2

|  |  | Examples |  |  |  |  |  |  |  |
|---|---|---|---|---|---|---|---|---|---|
|  |  | 1 | 2 | 3 | 4 | 5 | 6 | 7 | 8 |
| (I) | Sample | A-1 | A-1 | A-1 | A-1 | A-1 | A-1 | A-1 | A-1 |
|  |  | 50 | 50 | 50 | 50 | 50 | 50 | 50 | 50 |
|  | NR RSS #1 | 50 | 50 | 50 | 50 | 50 | 50 | 50 | 50 |
|  | Carbon black (*1) | 35 | 30 | 20 | 15 | 22.5 | 15 | 45 | 30 |
|  | Silica (*2) | 5 | 10 | 20 | 25 | 7.5 | 15 | 15 | 30 |
|  | Silane coupling agent (*3) | 0.5 | 1 | 2 | 2.5 | 0.75 | 1.5 | 1.5 | 3 |
|  | Prompter NS (*4) | 1.13 | 1.25 | 1.5 | 1.63 | 1.25 | 1.5 | 1.25 | 1.5 |
|  | Prompter D (*5) | 0.13 | 0.25 | 0.5 | 0.63 | 0.25 | 0.5 | 0.25 | 0.5 |
|  | Sulfur | 2 | 2 | 2 | 2 | 2 | 2 | 2 | 2 |
|  | Silica/ Reinforcer Ratio (%) | 12.5 | 25 | 50 | 62.5 | 25 | 50 | 25 | 50 |
| (II) | Mooney viscosity | 104 | 100 | 98 | 100 | 86 | 86 | 138 | 133 |
|  | Die swell | 92 | 95 | 103 | 107 | 103 | 108 | 90 | 99 |
| (III) | Hardness | 101 | 101 | 101 | 103 | 97 | 97 | 112 | 112 |
|  | 100% tensile stress | 126 | 129 | 133 | 129 | 102 | 106 | 188 | 179 |
|  | Tensile strength | 108 | 108 | 103 | 102 | 104 | 105 | 115 | 107 |
|  | Tear strength | 103 | 114 | 111 | 102 | 104 | 104 | 102 | 106 |
|  | Flex crack growth | 88 | 97 | 105 | 109 | 91 | 104 | 95 | 103 |
| (IV) | M25 (MPa) | 1.27 | 1.31 | 1.32 | 1.30 | 1.05 | 1.10 | 1.78 | 1.78 |
|  | Loss coefficient (tan δ) | 0.082 | 0.073 | 0.055 | 0.051 | 0.050 | 0.034 | 0.117 | 0.098 |
|  | Specific gravity (SG) | 1.088 | 1.091 | 1.096 | 1.099 | 1.060 | 1.065 | 1.145 | 1.153 |

TABLE 2-continued

|  | Examples | | | | | | | |
| --- | --- | --- | --- | --- | --- | --- | --- | --- |
|  | 1 | 2 | 3 | 4 | 5 | 6 | 7 | 8 |
| Index (ΔH) | 0.070 | 0.061 | 0.046 | 0.043 | 0.050 | 0.033 | 0.075 | 0.063 |
| ΔH exponent | 70 | 60 | 45 | 43 | 50 | 33 | 75 | 63 |

(I): Compounding Formula (parts by mass)
(II): Compounded material (index)
(II): Vulcanized material (index)
(IV): Energy saving property
(*1): DiaBlack H from Mitsubishi Chemical Corp.
(*2): Nipsil AQ from Tosoh Silica
(*3): Si69 from Degussa
(*4): Nocceler MS from Ouchi Shinko Chemical Industrial
(*5): Nocceler D from Ouchi Shinko Chemical Industrial

TABLE 3

|  |  | Comparison examples | | | | | |
| --- | --- | --- | --- | --- | --- | --- | --- |
|  |  | 1 | 2 | 3 | 4 | 5 | 6 |
| (I) | Sample | A-2 | A-1 | A-1 | A-1 | A-1 | A-1 |
|  |  | 50 | 50 | 50 | 50 | 50 | 50 |
|  | NR RSS #1 | 50 | 50 | 50 | 50 | 50 | 50 |
|  | Carbon black (*1) | 40 | 40 | 10 | — | 7.5 | 15 |
|  | Silica (*2) | — | — | 30 | 40 | 22.5 | 45 |
|  | Silane coupling agent (*3) | — | — | 3 | 4 | 2.25 | 4.5 |
|  | Prompter NS (*4) | 1 | 1 | 1.75 | 2 | 1.75 | 1.75 |
|  | Prompter D (*5) | — | — | 0.75 | 1 | 0.75 | 0.75 |
|  | Sulfur | 2 | 2 | 2 | 2 | 2 | 2 |
|  | Silica/Reinforcer Ratio (%) | 0 | 0 | 75 | 100 | 75 | 75 |
| (II) | Mooney viscosity | 100 | 105 | 100 | 95 | 89 | 133 |
|  | Die swell | 100 | 89 | 111 | 124 | 115 | 114 |
| (III) | Hardness | 100 | 105 | 103 | 106 | 100 | 113 |
|  | 100% tensile stress | 100 | 121 | 134 | 140 | 117 | 172 |
|  | Tensile strength | 100 | 106 | 91 | 77 | 84 | 97 |
|  | Tear strength | 100 | 105 | 93 | 81 | 86 | 93 |
|  | Flex crack growth | 100 | 87 | 151 | 220 | 143 | 136 |
| (IV) | M25 (MPa) | 1.11 | 1.32 | 1.35 | 1.43 | 1.20 | 1.75 |
|  | Loss coefficient (tan δ) | 0.104 | 0.105 | 0.038 | 0.039 | 0.030 | 0.085 |
|  | Specific gravity (SG) | 1.083 | 1.083 | 1.105 | 1.109 | 1.070 | 1.163 |
|  | Index (ΔH) | 0.101 | 0.086 | 0.031 | 0.030 | 0.027 | 0.056 |
|  | ΔH exponent | 100 | 85 | 31 | 30 | 26 | 56 |

(I): Compounding Formula (parts by mass)
(II): Compounded material (index)
(II): Vulcanized material (index)
(IV): Energy saving property
(*1): DiaBlack H from Mitsubishi Chemical Corp.
(*2): Nipsil AQ from Tosoh Silica
(*3): Si69 from Degussa
(*4): Nocceler NS from Ouchi Shinko Chemical Industrial
(*5): Nocceler D from Ouchi Shinko Chemical Industrial

TABLE 4

| Common compounding agent | Compounded amount (parts by mass) |
|---|---|
| Process oil (*6) | 3 |
| Zinc oxide | 3 |
| Stearic acid | 2 |
| Anti-oxidant (*7) | 2 |

(*6) 110 from Esso oil
(*7) Antigen 6C from Sumitomo Chemical

The compounded materials according to Examples 1-8 and Comparison examples 1-6 were press-vulcanized at 150° C. for 30 minutes to obtain vulcanized materials. The resultant vulcanized materials were subjected to measurement of physical properties, which are shown in Tables 2 and 3. FIG. 2 shows relations among the die swell, the resistance to flex crack growth and ΔH in Examples 1-4 and Comparison examples 2-4 in which the compounding amount of the rubber enforce is equal to 40 parts by mass.

As can be found from the results in Tables 2 and 3, the compounded materials and vulcanized materials according to Examples 1-8 have improved physical properties, such as extrusion processability, tensile stress, tensile strength, tear strength, resistance to flex crack growth, loss efficient, and ΔH in comparison with Comparison examples1-6. In addition, as can be found from FIG. 2, an increase in the amount of silica causes an excellent value of ΔH. The amount of silica in the reinforcer above 70 mass % though worsens the resistance to flex crack growth as can be found.

BRIEF DESCRIPTION OF THE DRAWINGS

FIG. 1 5000-fold electron micrographs of (a) Sample A-1 and (b) Sample A-2, both binarized with image analysis software (Win ROOF from Mitani Corporation).

Figure 1:
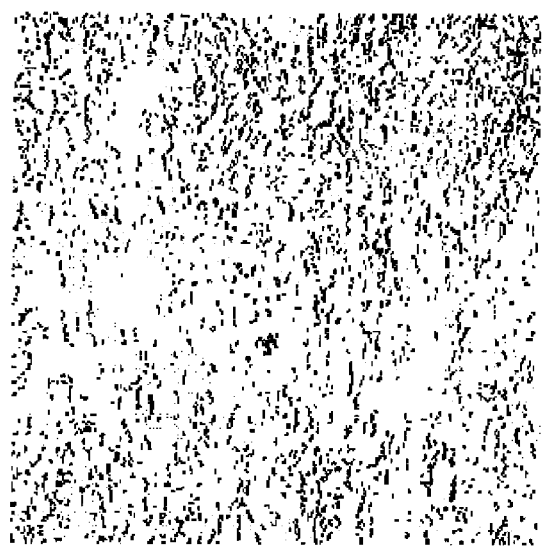
Figure 1:
Figure 2:
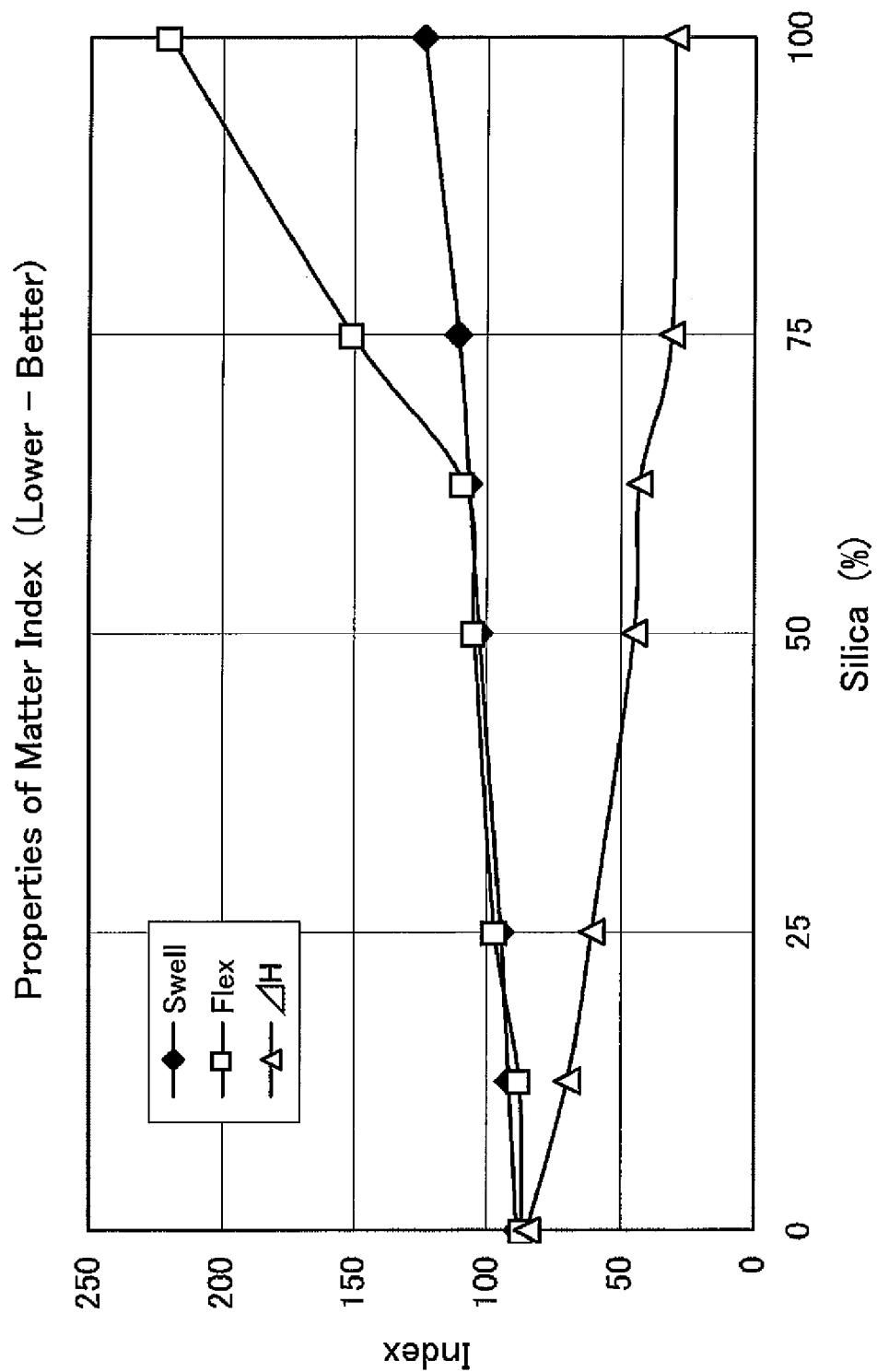
FIG. 2 Graphs showing relations among die swell, resistance to flex crack growth and ΔH in Examples 1-4 and Comparison examples 2-4 in which the compounding amount of the rubber enforce is equal to 40 parts by mass.

The invention claimed is:

1. A rubber composition for belt use, comprising:
   (A) 90-5 mass % of a vinyl-cis-polybutadiene rubber including (b) 1-30 mass % of specific syndiotactic 1,2-polybutadiene crystal fibers having an average fiber length of crystal fibers equal to 200 nm or below, an average aspect ratio of 10 or lower, the number of crystal fibers having a fiber length of 200 nm or below equal to 90 or more per 25 $\mu m^2$, and a melting point of 170° C. or higher, and (a) 99-70 mass % of a cis-polybutadiene rubber;
   (B) 10-95 mass % of a diene-based rubber other than (A); and
   (C) 20-70 parts by mass of a rubber reinforcing agent compounded on the basis of 100 parts by mass of the rubber components (A)+(B),
   wherein the rubber reinforcing agent (C) contains at least carbon black and silica, wherein the compounding amount of the silica in the rubber reinforcing agent is 70 mass % or less.

2. The rubber composition for belt use according to claim 1, wherein ΔH represented by Expression 1 is 0.1 or lower:

$$\Delta H = (SG \times \tan \delta)/M25 \quad \text{[Expression 1]}$$

(where SG denotes a specific gravity (g/cm$^3$) at 23° C.; tan δ a loss coefficient at a frequency of 10 Hz, a dynamic distortion of 2%, and 60° C.; and M25 a tensile stress (MPa) at 25% extension).

3. The rubber composition for belt use according to claim 1, wherein the vinyl-cis-polybutadiene rubber (A) has the following characteristics (i)-(iv):
   (i) the 1,2-polybutadiene crystal fibers (b) has (a molecular weight index), ηsp/c, ranging 0.5-4;
   (ii) the cis-polybutadiene rubber (a) has a cis-structure content of 90 mol % or more in the microstructure;
   (iii) the cis-polybutadiene rubber (a) has a relation between a toluene solution viscosity and a Mooney viscosity, T-cp/ML≧1; and
   (iv) the cis-polybutadiene rubber (a) has an intrinsic viscosity [η] ranging 1.0-5.0.

4. The rubber composition for belt use according to claim 1, wherein the diene-based rubber (B) other than (A) comprises at least one of natural rubber and polyisoprene.

5. A rubber belt comprising the rubber composition for belt use according to claim 4 used as a rubber base material.

6. The rubber composition for belt use according to claim 2, wherein the diene-based rubber (B) other than (A) comprises at least one of natural rubber and polyisoprene.

7. The rubber composition for belt use according to claim 3, wherein the diene-based rubber (B) other than (A) comprises at least one of natural rubber and polyisoprene.

8. A rubber belt comprising the rubber composition for belt use according to claim 1 used as a rubber base material.

9. A rubber belt comprising the rubber composition for belt use according to claim 2 used as a rubber base material.

10. A rubber belt comprising the rubber composition for belt use according to claim 3 used as a rubber base material.

* * * * *

UNITED STATES PATENT AND TRADEMARK OFFICE
CERTIFICATE OF CORRECTION

| | |
|---|---|
| PATENT NO. | : 7,872,066 B2 |
| APPLICATION NO. | : 12/303171 |
| DATED | : January 18, 2011 |
| INVENTOR(S) | : Naomi Okamoto and Takashi Wada |

It is certified that error appears in the above-identified patent and that said Letters Patent is hereby corrected as shown below:

Column 1, Line 3 insert the following paragraph following the title,

-- Related/priority Application

This application is a National Phase filing regarding International Application No. PCT/JP2008/053314, filed on February 26, 2008, which relies upon Japanese Application No. 2007-047891, filed on February 27, 2007 and Japanese Application No. 2007-207124, filed on August 8, 2008 for priority. --

Column 4, Line 18, "duisobutyl" should be -- diisobutyl --

Column 8, Line 28, "cis-1,4-polybutadiene" should be -- cis-1,4-structure --

Column 8, Line 29, "trans-1,4-polybutadiene" should be -- trans-1,4-structure --

Column 8, Line 29, "and vinyl-1,2-polybutadiene" should read -- and 1,2 structure (vinyl). --

Column 8, Line 42, "fibers (b) have a molecular" should read -- fibers (b) have reduced viscosity (a molecular weight index), --

Column 8, Line 47, "ML≧1" should read -- ML≥1. --

Column 18, Line 29, "T-cp/ML≧1; and" should read -- T-cp/ML≥1; and --

Signed and Sealed this
Seventh Day of February, 2012

David J. Kappos
*Director of the United States Patent and Trademark Office*